US011119453B2

United States Patent
Koshy et al.

(10) Patent No.: US 11,119,453 B2
(45) Date of Patent: Sep. 14, 2021

(54) SYSTEM AND METHOD FOR REMOTE NON-INTRUSIVE MONITORING OF ASSETS AND ENTITIES

(71) Applicant: Nishil Thomas Koshy, Ernakulam (IN)

(72) Inventors: Nishil Thomas Koshy, Ernakulam (IN); Dhananjai Bajpai, Kanpur (IN)

(73) Assignee: Nishil Thomas Koshy, Ernakulam (IN)

( * ) Notice: Subject to any disclaimer, the term of this patent is extended or adjusted under 35 U.S.C. 154(b) by 0 days.

(21) Appl. No.: 16/299,129

(22) Filed: Mar. 11, 2019

(65) Prior Publication Data
US 2019/0278236 A1    Sep. 12, 2019

(30) Foreign Application Priority Data

Mar. 9, 2018   (IN) .............................. 201841008810
Oct. 9, 2018   (IN) .............................. 201841038290

(51) Int. Cl.
*G05B 13/02*   (2006.01)
*H04L 29/08*   (2006.01)

(52) U.S. Cl.
CPC .......... *G05B 13/0265* (2013.01); *H04L 67/12* (2013.01)

(58) Field of Classification Search
CPC . G05B 13/0265; G05B 23/0259; H04L 67/12; H04L 67/125; H04W 4/38; Y04S 40/18
USPC ......................................................... 700/47
See application file for complete search history.

(56) References Cited

U.S. PATENT DOCUMENTS

| | | | | |
|---|---|---|---|---|
| 2002/0065698 A1* | 5/2002 | Schick | ................. | G06Q 10/063 705/7.36 |
| 2002/0120374 A1* | 8/2002 | Douros | ................. | G07C 5/085 701/34.4 |
| 2007/0021269 A1* | 1/2007 | Shum | ................. | A63B 69/0028 482/8 |
| 2013/0328688 A1* | 12/2013 | Price | ...................... | G01V 1/008 340/690 |
| 2014/0172241 A1* | 6/2014 | Shima | ................. | B60C 23/0488 701/49 |
| 2015/0066782 A1* | 3/2015 | Vainberg | ................. | G06Q 10/20 705/305 |
| 2015/0077263 A1* | 3/2015 | Ali | ............................ | G01L 3/10 340/679 |

* cited by examiner

*Primary Examiner* — Kenneth M Lo
*Assistant Examiner* — Mohammed Shafayet
(74) *Attorney, Agent, or Firm* — Barry Choobin; Patent 360LLC (57) ABSTRACT

The embodiments herein disclose a system and method for remote and non-intrusive monitoring of a plurality of assets and entities. The system comprises a central platform module, a client module, a plurality of sensor units and a plurality of entity modules. Each sensor device is configured for measuring vibrations and changes in orientation of physical structure in three-dimensional axis to generate sensor data. The system also comprises a machine learning module, which provides the system with the intelligence to extract relevance of a measured physical parameter to contextually provide actions to be taken. The embodiments herein also provide a system and method for remote and non-intrusive monitoring of a level of liquid fuel in an electric power generator device. The system comprises no intrusive mechanism to measure the actual level of liquid present in the electric power generator.

7 Claims, 4 Drawing Sheets

SYSTEM AND METHOD FOR REMOTE NON-INTRUSIVE MONITORING OF ASSETS AND ENTITIES

CROSS-REFERENCE TO RELATED APPLICATIONS

The embodiments herein are related to and claims the benefit of priority from the Indian Provisional Patent Application with Serial No. 201841008810 titled "SYSTEM AND METHOD FOR REMOTE NON-INTRUSIVE MONITORING OF ASSETS AND ENTITIES", filed on Mar. 9, 2018 and Indian Provisional Patent Application with Serial No. 201841038290 titled "SYSTEM AND METHOD FOR MONITORING INTEGRITY OF A STRUCTURE", filed on Oct. 9, 2018. The contents of all the above mentioned applications are incorporated in its entirety as reference herein.

BACKGROUND

Technical Field

The embodiments herein are generally related to the field of remote anomaly monitoring system for buildings and structures. The embodiments herein are particularly related to a system and method for remote and non-intrusive monitoring of a plurality of assets and entities. The embodiments herein are more particularly related to a system and method for remotely monitoring the structural integrity of a physical structure.

Description of the Related Art

Monitoring performance and controlling processes are two main aspects of the working of any large organization. With increasing number of global organizations and expanding footprint of organizations, especially organizations involved in engineering and technology sectors, the need for monitoring and controlling processes across geographies is becoming vital. Man-made structures such as bridges, buildings, roads, parking garages, amusement park rides, hills, and the ground are subjected to structural change as a result of many influencing factors. The structural change is a consequence of externally-induced vibration, such as vibration from local traffic, construction, earthquakes, wind, etc., and other factors. When vibrations caused to the structure remain within a structure's design parameters, the structure is unlikely to be at risk or a safety hazard.

However, natural disasters such as hurricanes, tornadoes, earthquakes, etc., man-caused disasters such as accidents and terrorist attacks, etc., deferred maintenance, heavy and/or long term use, exposure to corrosive elements/conditions, and aging are just some of the factors that bring about a structural degradation of the structure.

Currently used methods of remote monitoring employ a plurality of sensors and/or devices to measure a plurality of parameters in a single entity or asset. With increasing number and types of assets and entities spread across geographies, the complexity of using a plurality of sensor devices increases manifold. There are no efficient mechanisms described in the art for remotely monitoring an integrity of physical structures for identifying weak points and alerting the maintenance team regarding the same. An efficient system for detecting structural change in the physical structure and generating alerts helps in avoiding potentially dangerous situations.

Since the technologies and versions of assets and entities are constantly updated and/or replaced, there is also a need for constant replacement and/or upgrade of the measurement devices. Currently, there is no optimized and non-intrusive mechanism to measure a plurality of parameters of remotely located assets and/or entities using a generic set of sensors integrated in a single measurement device.

Hence, there is a need for a system for remote and non-intrusive monitoring of a plurality of assets and entities. There is also a need for a system and method to measure a plurality of physical parameters of assets and entities and provide automated and contextual controlling decisions to the plurality of assets and entities. There is also a need for a system and method for remote and non-intrusive monitoring and controlling of a level of liquid fuel in an electric power generator device through indirect measurement techniques. Still further there is a need for a system and method for remotely monitoring an integrity of a physical structures and generating alerts upon detecting an anomaly in the physical structure.

The above-mentioned shortcomings, disadvantages and problems are addressed herein and which will be understood by reading and studying the following specification.

OBJECTS OF THE EMBODIMENTS HEREIN

The primary object of the embodiments herein to provide a system and method for remote and non-intrusive monitoring of a plurality of assets and entities.

Another object of the embodiments herein to provide a system and method for remote and non-intrusive monitoring and controlling of a level of liquid fuel in an electric power generator device through indirect measurement techniques.

Yet another object of the embodiments herein to provide a system and method to measure a plurality of physical parameters of assets and entities and provide automated and contextual controlling decisions to the plurality of assets and entities.

Yet another object of the embodiments herein to provide a system for monitoring the working conditions for employees in an organization by measuring the physical parameters in the working environment.

Yet another object of the embodiments herein to provide a system for providing centralized and/or local alerts upon sensing an unsafe working environment for employees in an organization.

Yet another object of the embodiments herein to provide a system and method for remotely monitoring an integrity of a physical structure.

Yet another object of the embodiments herein to provide a system for remotely monitoring the integrity of a physical structure in a static manner.

Yet another object of the embodiments herein to provide a system for remotely monitoring the integrity of a physical structure in a dynamic manner.

These and other objects and advantages of the embodiments herein will become readily apparent from the following detailed description taken in conjunction with the accompanying drawings.

SUMMARY

The various embodiments herein provide a system for remote and non-intrusive monitoring of a plurality of assets and entities. The system comprises a plurality of sensors configured for measuring a plurality of physical parameters of an asset and/or entity. The system also comprises a transceiver coupled with each sensor. The transceiver is configured for transmitting the plurality of parameters measured by the sensors. The system further comprises a control station/central platform module communicatively coupled to the plurality of sensors and transceivers. The control station is configured for transmitting one or more operational instructions to the plurality of sensors and for receiving the measured parameters from the sensors. The control station comprises a processing unit configured for processing the measured plurality of parameters received from the plurality of sensors. The control station also comprises an analyzer configured for analyzing the measured plurality of parameters to detect an anomaly. The control station further comprise a machine learning module configured for identifying context related to the measured parameters and extracting relevance of each measured parameter to contextually provide actions to be taken.

According to one embodiment herein, the plurality of sensors are further configured for collecting data related to the time taken by an asset and/or an entity in a particular activity to determine one or more states of the entity, and wherein the one or more states comprises Idle state, Activity state and Anomaly state.

According to one embodiment herein, the asset and/or entity is said to be in idle state when not performing any of the preset set of activities, in active state when sensed to be performing at least one of the preset set of activities and in Anomaly state when the sensed parameter data crosses a pre-defined Anomaly threshold value. The system is further configured for providing an alert to the entity and/or asset by communicating through the control station.

According to one embodiment herein, the system is configured for being agnostic of the type of entity or asset and for acting as an add-on module to measure the performance of machines, physical structures and human employees in an organization.

According to one embodiment herein, the plurality of sensors are provided as a wearable device in case of the entity being human employees in an organization. The plurality of sensors is designed to be attached to the apparel or work apparatus of a human user/employee. The plurality of sensors are configured for monitoring the environmental conditions in which an employee is engaged in work activities and for measuring the time spent by the employee in performing the work related activities.

According to one embodiment herein, the machine learning module is further configured for learning and updating the threshold values for measurement of the plurality of parameters.

According to one embodiment herein, the system further comprises a client module remotely or locally connected to the control station/central platform module through wired or wireless means. The client module is configured for receiving a plurality of information from the central platform module. The plurality of information comprises total run time alerts and anomaly detection alerts. The client module is further configured for transmitting a plurality of commands to the central platform module. The plurality of commands comprise reset device command, auto learn command and new threshold time alert.

According to one embodiment herein, the system further comprises an alert generation module provided in the control station. The alert generation module is configured for generating an alert upon detecting at least one anomaly.

According to one embodiment herein, a method for remote and non-intrusive monitoring of a plurality of assets and entities is provided. The method comprises the steps of installing a plurality of sensors at one or more predetermined locations on a physical structure to be monitored. The method also comprises measuring vibrations and changes in an orientation of the physical structures in a three dimensional axis using the plurality of sensors. The method further comprises transmitting the measured parameters to a control station via transceiver coupled to each sensor. The method still further comprises processing and analyzing the measured received parameters to detect an anomaly using a processing unit and an analyzer unit respectively. The method still further comprises generating an alert upon detecting at least one anomaly.

According to one embodiment herein, the method further comprises the step of identifying context related to the measured parameters and extracting relevance of each measured parameter to contextually provide actions to be taken using a machine learning module.

The various embodiments herein provide a system and method for remotely monitoring an integrity of a physical structure. The physical structures, for example, include bridges over railways and water bodies, escalators, apartments, sky scrapers, bridges for metro, flyover and elevator structures.

According to one embodiment herein, a system for monitoring integrity of a structure in a static manner is disclosed. The system comprises a plurality of sensor devices mounted on a physical structure. Each sensor device among the plurality of sensor devices is configured for measuring vibrations and changes in an orientation of the physical structure in three-dimensional axis so as to generate measured data. A transceiver is provided for receiving a plurality of operational instructions used for monitoring the integrity of the physical structure and for transmitting the measured data. A control station is communicatively connected to each sensor device via the transceiver. The control station is configured for transmitting the operational instructions to the sensor devices and receiving the measured data from the plurality of sensor devices mounted on each physical structure.

The control station comprises a processing unit, an analyzer unit and an alert generation unit. The processing unit is configured for processing the measured data received from the plurality of sensor devices. The analyzer unit is coupled to the processing unit and configured for analyzing the measured data to detect an anomaly. The alert generation unit is coupled to the analyzer unit and configured for generating an alert upon detecting at least one anomaly.

According to one embodiment herein, a system for monitoring an integrity of a structure in a dynamic manner is disclosed. The system comprises at least one sensor device mounted on at least one unit of a locomotive. Each sensor device is configured for measuring vibrations and changes in an orientation of physical structures in a three dimensional axis and an exact location of the measurement using a GPS or any other geolocation sensor. The physical structure being the structure atop which the locomotive travels, a transceiver is communicatively connected to each sensor device. The transceiver is configured for receiving operational instructions for monitoring the integrity of the physical structure and for transmitting the measured data. A control station is communicatively connected to all sensor devices. The control station is configured for transmitting the operational instructions to the plurality of sensor devices and receiving the measured data from the plurality of sensor devices in each physical structure. The control station comprises a processing unit configured for processing the measured data from the sensor devices, an analyzer unit configured for analyzing the measured data to detect an anomaly and an alert generation unit configured for generating an alert upon detecting at least one anomaly.

According to one embodiment herein, a method for remotely monitoring an integrity of a structure in a static manner is described. The method comprises the steps of installing one or more sensor devices at one or more predetermined locations on a physical structure to be monitored; configuring each sensor device for measuring vibrations and changes in an orientation of the physical structures in a three dimensional axis; and wherein the physical structure being the structure on which the sensor device is mounted; connecting the sensor devices to a control station through a transceiver; collecting a measured data from the sensor devices of each physical structure at the control station; processing and analyzing the measured data to detect an anomaly; and generating an alert upon detecting at least one anomaly.

According to one embodiment herein a system and method for remote and non-intrusive monitoring of a plurality of assets and entities is provided. The embodiment herein also provides a system and method for remote and non-intrusive monitoring of a level of liquid fuel in an electric power generator device. The assets and/or entities are machines, equipments, human users and/or computing devices.

According to one embodiment herein, a system is provided to enable remote and non-intrusive monitoring of a plurality of assets and entities. The system comprises a central platform module, a client module, a plurality of sensor units and a plurality of entity modules. The central platform module is configured to be digitally stored on a server module, which is remotely or locally connected to the client module through wired or wireless means. The central platform module is configured to communicate with the plurality of sensor units and the client module. The central platform module is configured to communicatively receive a plurality of information from the sensor units such as idle time, active time data, alerts for anomaly condition, new auto machine learning settings and sensor unit health information. The central platform module is configured to communicatively transmit a plurality of information to the sensor units such as reset command, learning mode command, posting threshold and threshold values for idle, active and anomaly states of the plurality of entity modules.

According to one embodiment herein, a client module is provided. The client module is configured to be digitally stored on a server module, which is remotely or locally connected to the central platform module through wired or wireless means. The client module is configured to communicate with the plurality of sensor units and the central platform module. The client module is configured to communicatively receive a plurality of information from the central platform module such as total run time alerts and anomaly detection alert. The client module is configured to communicatively transmit a plurality of information to the central platform module such as reset device command, auto learn command and new threshold time alert.

According to one embodiment herein, a sensor unit is provided. The sensor unit comprises a plurality of preset sensors to measure a plurality of physical parameters of an asset and/or entity. The sensor unit is also configured to collect the time taken by an asset and/or an entity in a particular activity. Depending on preset timing thresholds, the asset or entity is said to be in one of the three following states: Idle state, Activity state and Anomaly state. When an asset and/or entity is not performing any of the preset set of activities, the asset and/or entity is in Idle state. When an asset and/or entity is in Idle state, the sensor unit periodically posts system information to the central platform. When an asset and/or entity is sensed to be performing at least one of the preset set of activities, the asset and/or entity is in Active state. A timer in the sensor unit increments a counter every second the asset and/or entity performs the activity. When the time counter value crosses a posting time threshold, the total active time is posted to central platform. When the time counter and/or sensor data crosses the Anomaly threshold value, the system is configured to provide an alert to a plurality of entities and/or assets by communicating through the client module and central platform module.

According to one embodiment herein, the sensor unit is provided with a machine learning engine. The machine learning engine is configured to learn and update a plurality of preset threshold values from the data collected by the sensor unit. The updated threshold values provide the central platform with information on identifying the context related to a measured data or physical parameter. The machine learning module provides the system with the intelligence to extract relevance of a measured physical parameter to contextually provide actions to be taken.

According to one embodiment herein, a system is provided for preventive maintenance of machines by tracking a plurality of anomaly parameters. The system is also configured for tracking the up-time and down-time of machines.

According to one embodiment herein, a system is provided for providing optimal working conditions to employees in an organization. The sensor unit is provided as a wearable device, wherein the sensor unit is designed to be attached to the apparel or work apparatus of a human user. The sensor unit is configured to monitor the environmental conditions in which an employee is engaged in work activities. The sensor unit is also configured to measure the time spent by the employee in performing the work related activities.

According to one embodiment herein, a system is provided for remote and non-intrusive monitoring and controlling of a level of liquid fuel in an electric power generator device through indirect measurement techniques. The system comprises no intrusive mechanism to actually measure the level of liquid present in the electric power generator. The system is configured to non-intrusively connect with a sensor unit, where the sensor unit is configured to measure a plurality of physical parameters of the electric power generator. Through preset threshold values and correlation factors, the amount of fuel consumed by the electric power generator is determined. The system is also configured to automatically refill the fuel when the estimated fuel remaining is below a preset threshold value. The system is also configured to alert and intimate a plurality of assets and/or entities when the amount of fuel falls below a preset threshold value and enable manual refilling of the fuel through manual means.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Although the specific features of the embodiments herein are shown in separate drawings, it is done for convenience only as each feature may be combined with any or all of the other features in accordance with the embodiments herein.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for remote and non-intrusive monitoring of a plurality of assets and entities. The system comprises a plurality of sensors configured for measuring a plurality of physical parameters of an asset and/or entity. The system also comprises a transceiver coupled with each sensor. The transceiver is configured for transmitting the plurality of parameters measured by the sensors. The system further comprises a control station/central platform module communicatively coupled to the plurality of sensors and transceivers. The control station is configured for transmitting one or more operational instructions to the plurality of sensors and for receiving the measured parameters from the sensors. The control station comprises a processing unit configured for processing the measured plurality of parameters received from the plurality of sensors. The control station also comprises an analyzer configured for analyzing the measured plurality of parameters to detect an anomaly. The control station further comprise a machine learning module configured for identifying context related to the measured parameters and extracting relevance of each measured parameter to contextually provide actions to be taken.

According to one embodiment herein, the plurality of sensors are further configured for collecting data related to the time taken by an asset and/or an entity in a particular activity to determine one or more states of the entity, and wherein the one or more states comprises Idle state, Activity state and Anomaly state.

According to one embodiment herein, the asset and/or entity is said to be in idle state when not performing any of the preset set of activities, in active state when sensed to be performing at least one of the preset set of activities and in Anomaly state when the sensed parameter data crosses a pre-defined Anomaly threshold value. The system is further configured for providing an alert to the entity and/or asset by communicating through the control station.

According to one embodiment herein, the system is configured for being agnostic of the type of entity or asset and for acting as an add-on module to measure the performance of machines, physical structures and human employees in an organization.

According to one embodiment herein, the plurality of sensors are provided as a wearable device in case of the entity being human employees in an organization. The plurality of sensors are designed to be attached to the apparel or work apparatus of a human user/employee. The plurality of sensors are configured for monitoring the environmental conditions in which an employee is engaged in work activities and for measuring the time spent by the employee in performing the work related activities.

According to one embodiment herein, the machine learning module is further configured for learning and updating the threshold values for measurement of the plurality of parameters.

According to one embodiment herein, the system further comprises a client module remotely or locally connected to the control station/central platform module through wired or wireless means. The client module is configured for receiving a plurality of information from the central platform module. The plurality of information comprises total run time alerts and anomaly detection alerts. The client module is further configured for transmitting a plurality of commands to the central platform module. The plurality of commands comprise reset device command, auto learn command, new thresholds command and time alert setting command.

According to one embodiment herein, the system further comprises an alert generation module provided in the control station. The alert generation module is configured for generating an alert upon detecting at least one anomaly.

According to one embodiment herein, a method for remote and non-intrusive monitoring of a plurality of assets and entities is provided. The method comprises the steps of installing a plurality of sensors at one or more predetermined locations on a physical structure to be monitored. The method also comprises measuring vibrations and changes in an orientation of the physical structures in a three dimensional axis using the plurality of sensors. The method further comprises transmitting the measured parameters to a control station via transceiver coupled to each sensor. The method still further comprises processing and analyzing the measured received parameters to detect an anomaly using a processing unit and an analyzer unit respectively. The method still further comprises generating an alert upon detecting at least one anomaly.

According to one embodiment herein, the method further comprises the step of identifying context related to the measured parameters and extracting relevance of each measured parameter to contextually provide actions to be taken using a machine learning module.

The various embodiments herein provide a system and method for remotely monitoring an integrity of a physical structure. The physical structures, for example, include bridges over railways and water bodies, escalators, apartments, sky scrapers, bridges for metro, flyover and elevator structures.

According to one embodiment herein, a system for monitoring integrity of a structure in a static manner is disclosed.

The system comprises a plurality of sensor devices mounted on a physical structure. Each sensor device among the plurality of sensor devices is configured for measuring vibrations and changes in an orientation of the physical structure in three-dimensional axis so as to generate measured data. A transceiver is provided for receiving a plurality of operational instructions used for monitoring the integrity of the physical structure and for transmitting the measured data. A control station is communicatively connected to each sensor device via the transceiver. The control station is configured for transmitting the operational instructions to the sensor devices and receiving the measured data from the plurality of sensor devices mounted on each physical structure.

According to one embodiment herein, the control station comprises a processing unit, an analyzer unit and an alert generation unit. The processing unit is configured for processing the measured data received from the plurality of sensor devices. The analyzer unit is coupled to the processing unit and configured for analyzing the measured data to detect an anomaly. The alert generation unit is coupled to the analyzer unit and configured for generating an alert upon detecting at least one anomaly.

According to one embodiment herein, a system for monitoring an integrity of a structure in a dynamic manner is disclosed. The system comprises at least one sensor device mounted on at least one unit of a locomotive. Each sensor device is configured for measuring vibrations and changes in an orientation of physical structures in a three dimensional axis and an exact location of the measurement using a GPS or any other geolocation sensor. The physical structure being the structure atop which the locomotive travels, a transceiver is communicatively connected to each sensor device. The transceiver is configured for receiving operational instructions for monitoring the integrity of the physical structure and for transmitting the measured data. A control station is communicatively connected to each sensor device through the transceiver. The control station is configured for transmitting the operational instructions to the plurality of sensor devices and receiving the measured data from the plurality of sensor devices in each physical structure. The control station comprises a processing unit configured for processing the measured data from the sensor devices, an analyzer unit configured for analyzing the measured data to detect an anomaly and an alert generation unit configured for generating an alert upon detecting at least one anomaly.

According to one embodiment herein, a method for remotely monitoring an integrity of a structure in a static manner is described. The method comprises the steps of installing one or more sensor devices at one or more predetermined locations on a physical structure to be monitored; configuring each sensor device for measuring vibrations and changes in an orientation of the physical structures in a three dimensional axis; and wherein the physical structure being the structure on which the sensor device is mounted; connecting the sensor devices to a control station through a transceiver; collecting a measured data from the sensor devices of each physical structure at the control station; processing and analyzing the measured data to detect an anomaly; and generating an alert upon detecting at least one anomaly.

According to one embodiment herein, a method for remotely monitoring an integrity of a structure in a dynamic manner is disclosed. The method comprises the steps of installing a sensor device on at least one unit of a locomotive that moves atop a physical structure to be monitored, configuring each sensor device for measuring vibrations and changes in an orientation in a three dimensional axis and an exact location of the measurement using a GPS or any other geo-location sensor, connecting each sensor device to a control station through a transceiver, collecting a measured data from the sensor devices of multiple locations at the control station; processing/analyzing the collected measured data to detect an anomaly; and generating an alert upon detecting at least one anomaly.

According to one embodiment herein a system and method for remote and non-intrusive monitoring of a plurality of assets and entities is provided. The embodiments herein also provide a system and method for remote and non-intrusive monitoring of a level of liquid fuel in an electric power generator device. The assets and/or entities are machines, equipments, human users and/or computing devices.

According to one embodiment herein, a system is provided to enable remote and non-intrusive monitoring of a plurality of assets and entities. The system comprises a central platform module, a client module, a plurality of sensor units and a plurality of entity modules. The central platform module is configured to be digitally stored on a server module, which is remotely or locally connected to the client module through wired or wireless means. The central platform module is configured to communicate with the plurality of sensor units and the client module. The central platform module is configured to communicatively receive a plurality of information from the sensor units such as idle time, active time data, alerts for anomaly condition, new auto machine learning settings and sensor unit health information. The central platform module is configured to communicatively transmit a plurality of information to the sensor units such as reset command, learning mode command, posting threshold and threshold values for idle, active and anomaly states of the plurality of entity modules.

According to one embodiment herein, a client module is provided. The client module is configured to be digitally stored on a server module, which is remotely or locally connected to the central platform module through wired or wireless means. The client module is configured to communicate with the plurality of sensor units and the central platform module. The client module is configured to communicatively receive a plurality of information from the central platform module such as total run time alerts and anomaly detection alert. The client module is configured to communicatively transmit a plurality of information to the central platform module such as reset device command, auto learn command and new threshold time alert.

According to one embodiment herein, a sensor unit is provided. The sensor unit comprises a plurality of preset sensors to measure a plurality of physical parameters of an asset and/or entity. The sensor unit is also configured to collect the time taken by an asset and/or an entity in a particular activity. Depending on preset timing thresholds, the asset or entity is said to be in one of the three following states: Idle state, Activity state and Anomaly state. When an asset and/or entity is not performing any of the preset set of activities, the asset and/or entity is in Idle state. When an asset and/or entity is in Idle state, the sensor unit periodically posts system information to the central platform. When an asset and/or entity is sensed to be performing at least one of the preset set of activities, the asset and/or entity is in Active state. A timer in the sensor unit increments a counter every second the asset and/or entity performs the activity. When the time counter value crosses a posting time threshold, the total active time is posted to central platform. When the time counter and/or sensor data crosses the Anomaly threshold value, the system is configured to provide an alert to a plurality of entities and/or assets by communicating through the client module and central platform module.

According to one embodiment herein, the sensor unit is provided with a machine learning engine. The machine learning engine is configured to learn and update a plurality of preset threshold values from the data collected by the sensor unit. The updated threshold values provide the central platform with information on identifying the context related to a measured data or physical parameter. The machine learning module provides the system with the intelligence to extract relevance of a measured physical parameter to contextually provide actions to be taken.

According to one embodiment herein, a system is provided for preventive maintenance of machines by tracking a plurality of anomaly parameters. The system is also configured for tracking the up-time and down-time of machines.

According to one embodiment herein, a system is provided for providing optimal working conditions to employees in an organization. The sensor unit is provided as a wearable device, wherein the sensor unit is designed to be attached to the apparel or work apparatus of a human user. The sensor unit is configured to monitor the environmental conditions in which an employee is engaged in work activities. The sensor unit is also configured to measure the time spent by the employee in performing the work related activities.

According to one embodiment herein, a system is provided for remote and non-intrusive monitoring and controlling of a level of liquid fuel in an electric power generator device through indirect measurement techniques. The system comprises no intrusive mechanism to actually measure the level of liquid present in the electric power generator. The system is configured to non-intrusively connect with a sensor unit, where the sensor unit is configured to measure a plurality of physical parameters of the electric power generator. Through preset threshold values and correlation factors, the amount of fuel consumed by the electric power generator is determined. The system is also configured to automatically refill the fuel when the estimated fuel remaining is below a preset threshold value. The system is also configured to alert and intimate a plurality of assets and/or entities when the amount of fuel falls below a preset threshold value and enable manual refilling of the fuel through manual means.

According to one embodiment herein, the system is configured for non intrusive monitoring of people and machines. In this embodiment the system monitors the person's or machine's activities to alert central platform about Idle state, Active state and Anomaly state. The sensor unit is configured for collecting and processing data from person or machine to find the state. When the person or machine is in Idle state, the sensor unit periodically posts system information. To find active state of person or machine, sensor unit comprises a state change threshold value. In case, the sensor data crosses the state change threshold value and stays below anomaly threshold value then active state is achieved and sensor unit increments a counter every second. When time counter crosses posting time threshold, total active time is posted to central platform. If sensor data value is above anomaly detection threshold value then direct post to central platform is immediately made as an alert. When sensor unit is set into auto machine learning mode, then the state change is recalibrated and anomaly threshold value is posted to the central platform. The central platform pushes new posting threshold, state change, anomaly threshold values and clears time counter values by resetting sensor unit after receiving specific commands from client. The central platform sends total active/run time alert and anomaly detection alert to the client.

According to one embodiment herein, the person and machine monitoring is used for maintaining worker's health by tracking worker's duty/shift time in order to minimize fatigue and over time risk. The unit is mounted either on helmet or safety jacket (vibration sensor based). This also ensures optimal working conditions for workers, monitors environmental parameters and sends central/local alerts on encountering hazardous environment conditions (gas sensor based). This kind of monitoring is further used for DG fuel level monitoring and auto alerting near the petrol pumps for refueling, when fuel levels in DG are low. In one example embodiment, fuel level monitoring for remotely located DG sets, powering telephone towers is performed using the system. The system is still further used for preventive maintenance of machines by tracking anomaly parameters (e.g. vibrations, heat) and for tracking up/down time of machines, efficiency and temperature of machine.

Figure 1:
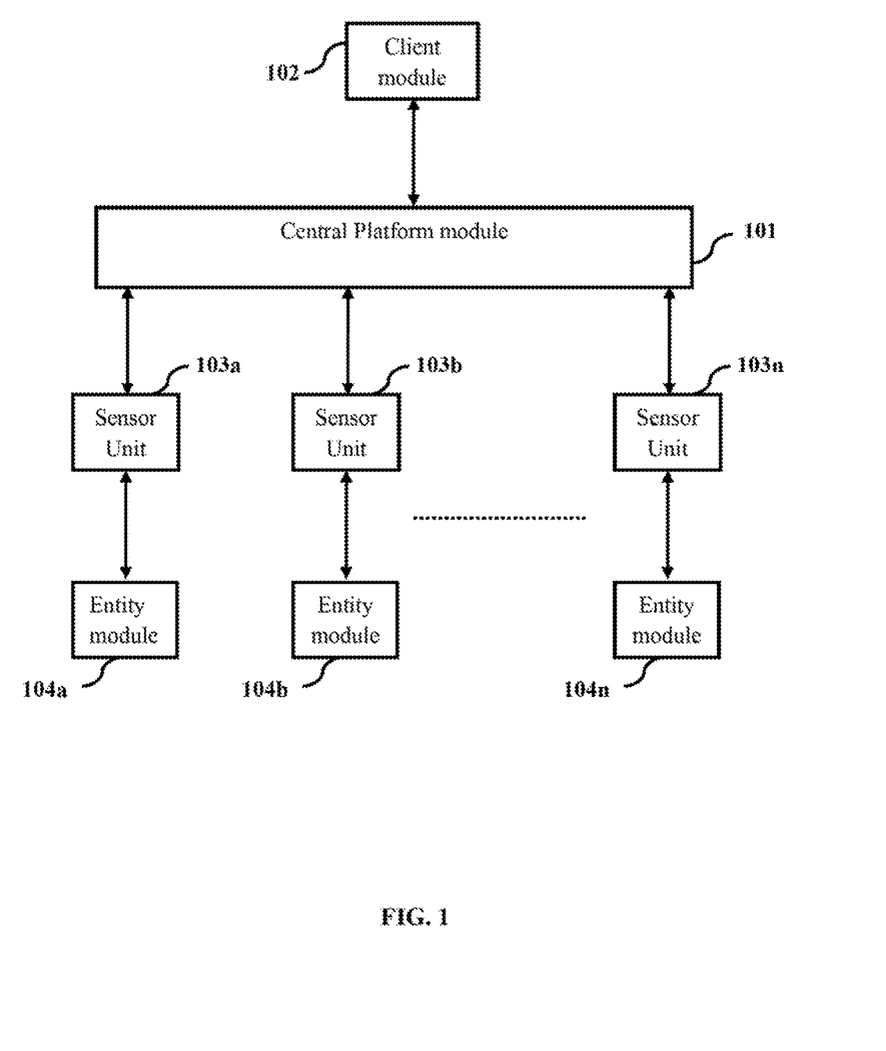
FIG. 1 illustrates a block diagram of a system for remote and non-intrusive monitoring of a plurality of assets and entities, according to one embodiment herein.

FIG. 1 illustrates a block diagram of a system for remote and non-intrusive monitoring of a plurality of assets and entities. The system comprises a central platform module 101, a client module 102, a plurality of sensor units 103a, 103b . . . , 103n and a plurality of entity modules 104a, 104b . . . , 104n. The central platform module 101 is configured to be digitally stored on a server module, which is remotely or locally connected to the client module 102 and a plurality of sensor units 103a, 103b . . . , 103n through wired or wireless means. The client module 102 is configured to communicate with the plurality of sensor units 103a, 103b . . . , 103n and the central platform module 101. The sensor unit 103a, 103b . . . , 103n comprises a plurality of preset sensors to measure a plurality of physical parameters of asset and/or entity modules 104a, 104b . . . , 104n. The assets and/or entities are civil or mechanical structures, machines, equipments, human users and/or computing devices 104a, 104b . . . , 104n.

Figure 2:
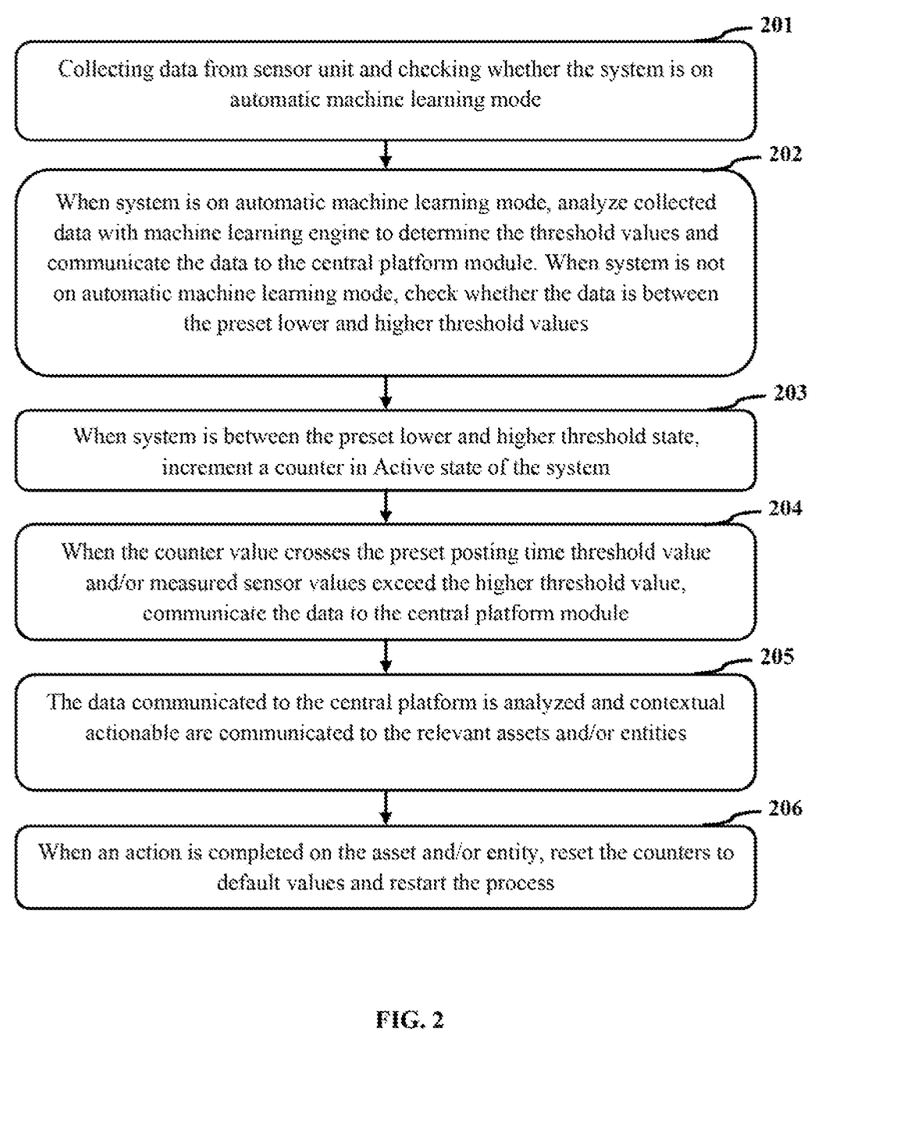
FIG. 2 illustrates a flow diagram of a method for enabling remote and non-intrusive monitoring of a plurality of assets and entities, according to one embodiment herein.

FIG. 2 illustrates a flow diagram of a method for enabling remote and non-intrusive monitoring of a plurality of assets and entities. The method comprises the following steps: Collecting data from sensor unit and checking whether the system is on automatic machine learning mode (201); When system is on automatic machine learning mode, analyze collected data with machine learning engine to determine the threshold values and communicate the data to the central platform module. When system is not on automatic machine learning mode, check whether the data is between the preset lower and higher threshold values (202); When system is between the preset lower and higher threshold state, increment a counter in Active state of the system (203); When the counter value crosses the preset posting time threshold value and/or measured sensor values exceed the higher threshold value, communicate the data to the central platform module (204); The data communicated to the central platform is analyzed and contextual actionable are communicated to the relevant assets and/or entities (205); and, When an action is completed on the asset and/or entity, reset the counters to default values and restart the process (206).

Figure 3:
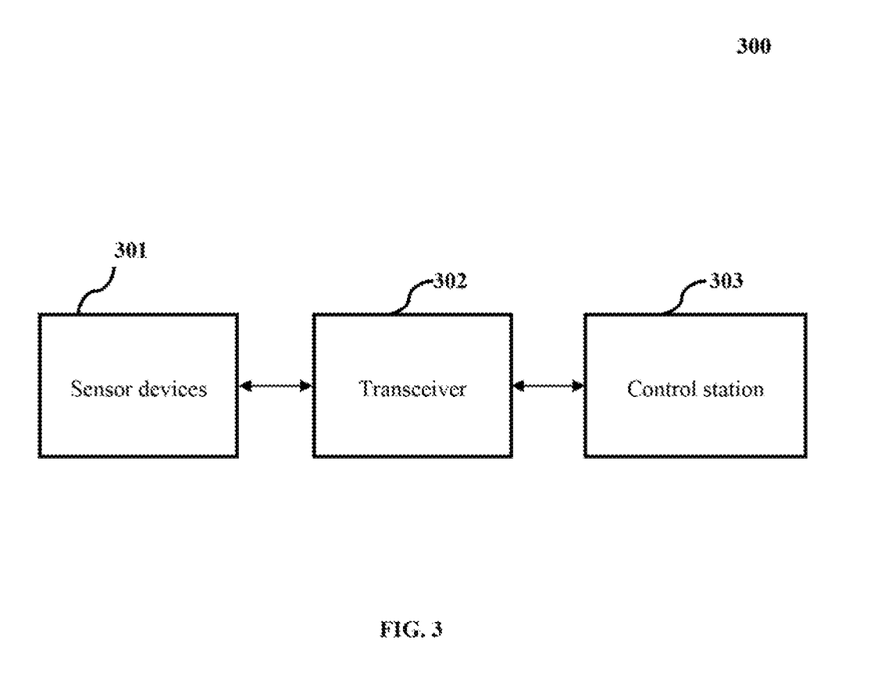
FIG. 3 illustrates a block diagram of a system for monitoring an integrity of a structure, according to one embodiments herein.

With respect to FIG. 3, the system 300 for monitoring an integrity of a structure in a static manner is disclosed. The system 300 comprises a set of sensor devices 301 mounted on a physical structure. Each sensor device 301 among the set of sensor devices 301 is configured for measuring vibrations and changes in the orientation of the physical structures in a three-dimensional axis. The transceiver 302 is provided for receiving the operational instructions used to monitor the integrity of the physical structure and for transmitting a measured data received from the sensor devices to the control station 303. The control station 303 is communicatively connected to each sensor devices 301 through the transceiver 302. The control station 303 is configured for transmitting the operational instructions to the sensor devices 301 and receiving the measured data from the sensor devices 301 of each physical structure.

The control station 303 comprises a processing unit configured for processing the measured data from the sensor devices 301. An analyzer unit is connected to the processing unit. The analyzer unit is configured for analyzing the measured data to detect an anomaly. An alert generation unit connected to the analyzer unit, for generating an alert upon detecting at least one anomaly.

According to one embodiment, the control station 303 comprises a processor and a memory. The memory (not shown) is configured to store a set of pre-determined rules. The memory (not shown) include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes, and/or a cloud based storage (cloud storage). According to one embodiment, the memory is configured to store information related to each sensor unit, operating parameters, historical reference data, anomaly thresholds, users who can monitor the structures and need to get alerts, rules for updating stored information, and the like.

The processor (not shown) is configured to cooperate with the transceivers and memory to receive and process all incoming sensor data, to learn normal working parameters based on historical data, to detect anomalies in real time data and to generate alerts based on predefined rules. The processor (not shown) is configured to cooperate with the memory to receive and process the pre-determined rules to obtain a set of system operating commands. The processor (not shown) is implemented as one or more microprocessors, microcomputers, microcontrollers, digital signal processors, central processing units, state machines, logic circuitries, and/or any devices that manipulate signals based on operational instructions. Among other capabilities, the processor (not shown) is configured to fetch and execute the set of predetermined rules stored in the memory to control modules of the system 300.

According to an embodiment, the control station 303 further comprises a database for storing measured data. Accordingly, real time parameters from the plurality of structures are collected and stored in the database. This is employed in training the analyzer unit.

According to one embodiment, the control station 303 is configured to enable a user to access the data using a standard user computing device connected to a public network such as Internet.

According to an embodiment, the system 300 for monitoring integrity of a structure in a dynamic manner is disclosed. According to an embodiment, the physical structure that is designed to be subjected to frequent vibrational excitations caused by the motion of a locomotive over the physical structure. The structure includes a metro bridge, a railway bridge or a bridge over a water body for enabling vehicular transport.

According to an embodiment, the system 300 comprises at least one sensor device 301 mounted on at least one unit of a locomotive. Each sensor device 301 is configured for measuring vibrations and changes in the orientation of a physical structure in a three-dimensional axis along with an exact location of measurement using a GPS or any other geolocation sensor. The physical structure being the physical structure atop which the locomotive travels. The transceiver 302 is communicatively connected to each sensor device 301. The transceiver 302 is configured for receiving operational instructions for monitoring the integrity of the physical structure and for transmitting the measured data to a control station 303. The control station 303 is communicatively connected to each the sensor device 301 through the transceiver 302. The control station 303 is configured for transmitting the operational instructions to the sensor devices 301 and receiving the measured data from the sensor devices 301. The control station 303 comprises a processing unit configured for processing the measured data from the sensor devices 301, an analyzer unit configured for analyzing the measured data to detect an anomaly and an alert generation unit configured for generating an alert upon detecting at least one anomaly.

According to an embodiment, the response (i.e., motion) of a physical structure caused by natural or man-made shocks is largely a function of the mechanical properties of the physical structure. These mechanical properties include the physical structure's shear wave velocity (i.e., the rate at which shear waves propagate through the physical structure) and the attenuation of the physical structure (i.e., the ability of the physical structure to attenuate the wave energy resulting from the natural or man-made shocks/vibrations). The shear wave velocity of the physical structure, together with the geometry of the building, controls the resonant frequencies of the physical structure. The attenuation of the physical structure determines the rate of energy dissipation in the physical structure, which in turn controls the vibration of the physical structure for a given excitation. The vibration of the physical structure is detected by the vibration sensor that is represented in the sensed data pattern. This data pattern is compared with standard sensor data patterns for identifying anomalies or one or more weak points in the physical structure.

According to an embodiment, the system 300 is configured for collecting real time parameters from the plurality of physical structures to detect abnormal vibrations to generate real time alerts to identify probable weak zones.

According to an embodiment, the analyzer unit is configured for remote data analysis for computing a standard sensor pattern of a structure. Further, the analyzer unit is configured for identifying of anomalies based on the standard sensor data patterns.

According to an embodiment, the analyzer unit is trained to differentiate the normal and deviated data patterns. The analyzer unit employs machine learning algorithms and is trained based on past data patterns of a single physical structure and/or data patterns of a plurality of similar physical structures that are exposed to similar operating conditions. An aggregation of the data patterns obtained from the plurality of physical structures that are under monitoring of the control station 303 at a plurality of time intervals is also stored in a database and used for training the analyzer unit.

According to an embodiment, the alert generation unit is configured for producing alerts on detecting anomalies in the data pattern. The alert thus generated is sent to a maintenance team responsible for maintenance of the physical structure and/or to one or more persons likely to be affected resulting from the damage, deterioration or break down of the physical structure.

Figure 4:
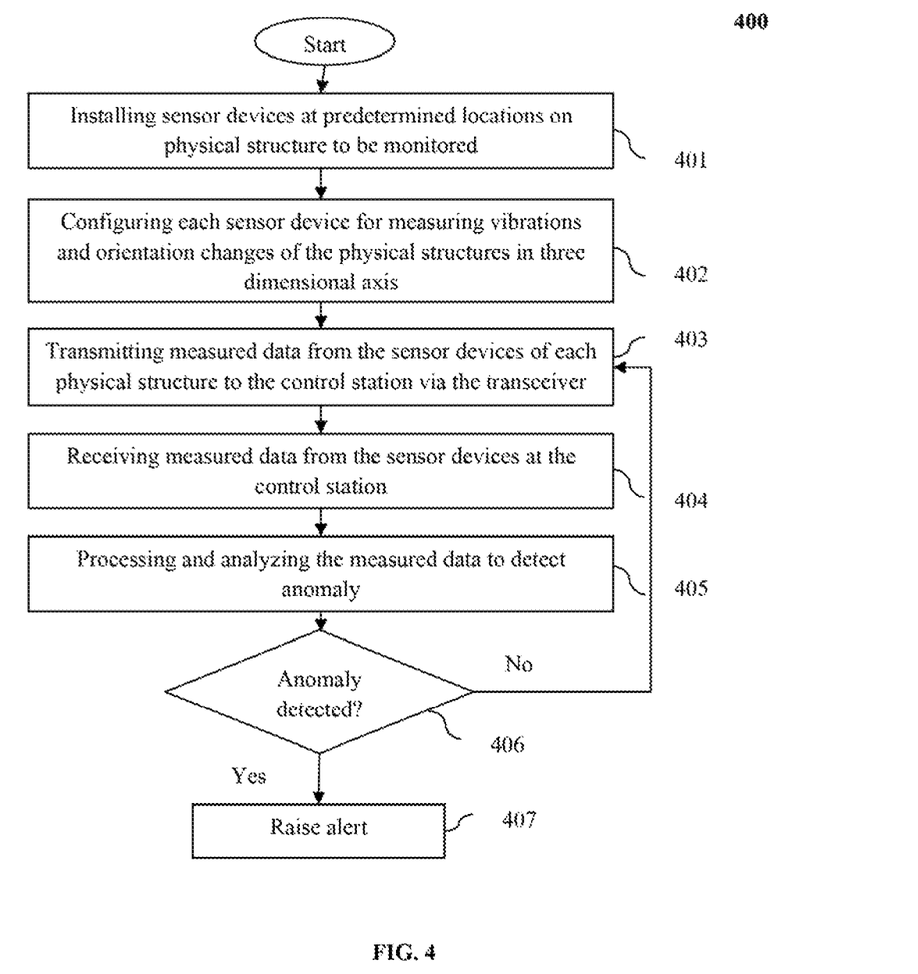
FIG. 4 illustrates a flow chart explaining a method for monitoring integrity of a structure, according to one embodiment herein.

With respect to FIG. 4, a method 400 of remotely monitoring the integrity of a structure in a static manner is disclosed. The method 400 comprises the steps of installing one or more sensor devices at one or more predetermined locations on a physical structure to be monitored (401); configuring each sensor device for measuring vibrations and changes in the orientation of the physical structures in a three dimensional axis (402); transmitting measured data from the sensor devices of each physical structure to the control station via the transceiver (403); receiving the measured data from the sensor devices at the control station (404); processing and analyzing the measured data to detect anomaly (405). Further, it is checked if the anomaly is detected (406) and an alert is raised upon detecting at least one anomaly (407). If not, then the flow returns back to step 403.

According to an embodiment, the step of analyzing comprises computing standard sensor data pattern based on machine learning and comparing obtained data pattern with standard sensor data pattern.

According to an embodiment, a method of remotely monitoring the integrity of a structure in a dynamic manner is disclosed. The method comprises the steps of installing a sensor device on at least one unit of a locomotive that moves over a physical structure to be monitored; configuring each sensor device for measuring vibrations and changes in the orientation of the physical structures in a three dimensional axis along with the exact location of the measurement using a GPS or any other geolocation sensor, connecting each sensor device to a control station through a transceiver; collecting measured data from the sensor devices of multiple locations at the control station; processing and analyzing the measured data to detect anomaly; and generating an alert upon detecting at least one anomaly.

According to an embodiment, the method further comprises training the analyzer module to differentiate between normal and deviated data patterns so as to enable the analyzer module to process the collected data pattern to detect anomaly.

It should be understood that the system and method of the embodiments herein are readily applicable to a wide variety of structures and that the aforementioned structural applications are only provided as examples. Thus, they are not to be used or considered to limit the breadth of the invention.

Further, the method is incorporated as a web application. Applications, as used herein, include any set of computing instructions. Applications instruct an electronic device to perform specified functions. Applications typically contain logic and methods for accessing, manipulating, and storing data. Applications also contain instructions on displaying and formatting data. For example, an application is configured to instruct an electronic device to access certain data and display it in a specified format and/or at a specified time.

According to an embodiment, applications are sent through any method suitable for such purpose. For example, the applications are downloaded to the user device through a Web browser or sent to the user device using a "push" type operation via a network protocol over a cable or wireless infrastructure. Possible means for pushing an application or application reference include, but are not limited to, email, embedding in a Web page, part of an RSS feed, a WAP™ push, or a Bluetooth™ transmission. The system for deploying applications to the user devices optionally includes a runtime environment for the application. A runtime environment is software that allows a user device to execute application code.

The functions described herein are implemented in hardware, software executed by a processor, firmware, or any combination thereof. If implemented in software executed by a processor, the functions are stored on or transmitted over as one or more instructions or code on a computer-readable medium. Other examples and implementations are within the scope and spirit of the disclosure and appended claims. For example, due to the nature of software, functions described above is executed using software executed by a processor, hardware, firmware, hardwiring, or combinations of any of these. Features implementing functions are also physically located at various positions, that are distributed such that portions of functions are implemented at different physical locations.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium is any available medium that is accessed by a general purpose or special purpose computer. By way of example, and not limitation, computer-readable media comprises RAM, ROM, EEPROM, flash memory, CD-ROM, DVD, or other optical disk storage, magnetic disk storage or other magnetic storage devices, or any other medium that are used to carry or store desired program code means in the form of instructions or data structures and that are accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various embodiments of the embodiments herein provide a system and method for remote and non-intrusive monitoring of a plurality of assets and entities. The invention provides a system and method to measure a plurality of physical parameters of assets and entities and provide automated and contextual controlling decisions to the plurality of assets and entities. The invention provides a generic sensor unit, which is enabled to non-intrusively monitor a plurality of entities. The system is agnostic of the type of entity or asset; it acts as an add-on module to measure the performance of machines and human employees in an organization. The invention provides an optimized measurement and control mechanism for multiple entities in a same organization. The invention also comprises machine learning capabilities that enable the system to learn and update the threshold values for measurement of a plurality of parameters. The invention enables a non-intrusive and indirect measurement technique that requires minimal customization, which optimizes the use of resources and minimizes the use of a plurality of sensor systems. The invention also provides a system and method for remote and non-intrusive monitoring and controlling of a level of liquid fuel in an electric power generator device through indirect measurement techniques.

Further, the system and method also helps in remotely monitoring integrity of a physical structure in a static as well as dynamic manner. The embodiments herein provides local and central insights about physical health of multiple structures. The embodiments herein provides a technique to differentiate between normal and deviated data patterns so as to analyze obtained data pattern in order to detect anomaly. The embodiments herein provides fully automated alerts to the maintenance team upon detection of an anomaly in the physical structure. Further, the system described in the embodiments herein generates automatic central and local alarms on anomaly detection thereby facilitating avoidance of breakdown and accidents resulting from damage occurred to the physical structure.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for remote and non-intrusive monitoring of a plurality of assets and entities, the system comprises:
    a plurality of sensors configured for measuring a plurality of physical parameters of an asset and/or entity of the plurality of assets and entities; and
    a transceiver coupled with each of the plurality of sensors, and wherein the transceiver is configured for transmitting the plurality of physical parameters measured by the sensors;
    a control station/central platform module communicatively coupled to the plurality of sensors and the transceiver, and wherein the control station/central platform module is configured for transmitting one or more operational instructions to the plurality of sensors and for receiving the plurality of measured physical parameters from the sensors;
    a processing unit provided in the control station/central platform module, and wherein the processing unit is configured for processing the plurality of measured physical parameters received from the plurality of sensors;
    an analyzer unit provided in the control station/central platform module, and wherein the analyzer unit is configured for analyzing the plurality of measured physical parameters to detect an anomaly; and
    a machine learning module provided in the control station/central platform module, and wherein the machine learning module is configured for identifying context related to the plurality of measured physical parameters and extracting relevance of each of the plurality of measured physical parameters to contextually provide actions to be taken;
    a client module remotely or locally connected to the control station/central platform module through wired or wireless means, and wherein the client module is configured for receiving a plurality of information from the control station/central platform module, and wherein the plurality of information comprise total run time alerts and anomaly detection alerts, and
    wherein the client module is further configured for transmitting a plurality of commands to the control station/central platform module, and wherein the plurality of commands comprise reset device command, auto learn command, new threshold command and a command for setting time alerts,
    wherein the plurality of sensors are configured for using with any type of assets and entities of the plurality of assets and entities and for acting as an add-on module to measure performance of machines, physical structures and human employees in an organization, and
    wherein the plurality of sensors are provided as a wearable device when the entity is the human employee in the organization, and
    wherein the plurality of sensors are designed to be attached to apparel or work apparatus of the human employee, and
    wherein the plurality of sensors are configured for monitoring environmental conditions in which an employee is engaged in work related activities by measuring a plurality of physical parameters in the working environment for sensing an unsafe working environment for the employee in the organization and for measuring a time spent by the employee in performing the work related activities, and
    wherein the plurality of assets and entities are machines, equipments, human users and computing devices, and
    wherein the physical structures include bridges over railways, bridges over water bodies, escalators, apartments, skyscrapers, bridges for metro, flyover and elevator structures, and
    wherein the plurality of assets and entities are remotely located assets and entities across geographies.

2. The system according to claim 1, wherein the plurality of sensors are further configured for collecting data related to a time taken by an asset and/or an entity of the plurality of assets and entities in a particular activity to determine one or more states/conditions of the asset and/or entity, and wherein the one or more states/conditions comprise an idle state/condition, an activity state/condition and an anomaly state/condition.

3. The system according to claim 1, wherein the asset and/or entity is judged to be in idle state/condition, when the asset and/or entity is found/sensed to be not performing any one of a plurality of preset activities, and
    wherein the asset and/or entity is judged to be in active state/condition, when the asset and/or entity is found/sensed to be performing at least one of the preset activities, and
    wherein the asset and/or entity is judged to be in anomaly state/condition, when a measured parameter of the plurality of measured parameters crosses a pre-defined anomaly threshold value, and
    wherein the system is further configured for providing an alert to the asset and/or entity by communicating through the control station/central platform module.

4. The system according to claim 1, wherein the machine learning module is further configured for learning and updating threshold values for the plurality of measured physical parameters.

5. The system according to claim 1, further comprises an alert generation module provided in the control station/central platform module, and wherein the alert generation module is configured for generating an alert upon detecting the at least one anomaly.

6. A method for remote and non-intrusive monitoring of a plurality of assets and entities, the method comprising the steps of:

installing a plurality of sensors at one or more predetermined locations of a physical structure to be monitored;

measuring, as parameters, vibrations and changes in an orientation of the physical structure in a three dimensional axis using the plurality of sensors;

transmitting the measured parameters to a control station/central platform module via transceiver coupled to each of the sensors;

processing and analyzing the received measured parameters to detect an anomaly using a processing unit and an analyzer unit respectively; and generating an alert upon detecting the at least one anomaly;

connecting a client module remotely or locally to the control station/central platform module through wired or wireless means, and wherein the client modulo is configured for receiving a plurality of information from the control station/central platform module, and wherein the plurality of information comprise total run time alerts and anomaly detection alerts, and wherein the client module is further configured for transmitting a plurality of commands to the control station/central platform module, and wherein the plurality of commands comprise reset device command, auto learn command, new threshold command and a command for setting time alerts;

wherein the plurality of sensors are configured for using with any type of assets and entities of the plurality of assets and entities and for acting as an add-on module to measure performance of machines, physical structures and human employees in an organization, and wherein the plurality of sensors are provided as a wearable device when the entity is the human employee in the organization, and wherein the plurality of sensors are designed to be attached to apparel or work apparatus of the human employee, and wherein the plurality of sensors are configured for monitoring environmental conditions in which an employee is engaged in work related activities by measuring a plurality of physical parameters in the working environment for sensing an unsafe working environment for the employee in the organization and for measuring a time spent by the employee in performing the work related activities, and wherein the plurality of assets and entities are machines, equipments, human users and computing devices, and wherein the physical structures include bridges over railways, bridges over water bodies, escalators, apartments, skyscrapers, bridges for metro, flyover and elevator structures, and wherein the plurality of assets and entities are remotely located assets and entities across geographies.

7. The method according to claim 6, wherein the method further comprises the step of identifying context related to the measured parameters and extracting relevance of each of the measured parameters to contextually provide actions to be taken using a machine learning module.

* * * * *